(12) United States Patent
Yi et al.

(10) Patent No.: US 10,991,469 B2
(45) Date of Patent: Apr. 27, 2021

(54) COOLING APPARATUS FOR MOLTEN CORE MATERIAL

(71) Applicant: KOREA ATOMIC ENERGY RESEARCH INSTITUTE, Daejeon (KR)

(72) Inventors: Sung-Jae Yi, Gongju-si (KR); Hyun Sik Park, Daejeon (KR); Rae-Joon Park, Daejeon (KR); Ki Yong Choi, Daejeon (KR); Kwang Soon Ha, Daejeon (KR); Seong-Wan Hong, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 188 days.

(21) Appl. No.: 16/299,330

(22) Filed: Mar. 12, 2019

(65) Prior Publication Data

US 2020/0075183 A1  Mar. 5, 2020

(30) Foreign Application Priority Data

Sep. 3, 2018  (KR) .......................... 10-2018-0104724

(51) Int. Cl.
*G21C 9/016* (2006.01)
*G21C 15/18* (2006.01)
*G21C 15/02* (2006.01)

(52) U.S. Cl.
CPC ............. *G21C 9/016* (2013.01); *G21C 15/18* (2013.01); *G21C 15/02* (2013.01)

(58) Field of Classification Search
CPC ........ G21C 9/016; G21C 15/18; G21C 15/02; Y02E 30/30
USPC ......................................................... 376/280
See application file for complete search history.

(56) References Cited

U.S. PATENT DOCUMENTS

| | | | | |
|---|---|---|---|---|
| 4,116,764 A | * | 9/1978 | Jones ..................... | G21C 9/016 376/280 |
| 4,130,459 A | * | 12/1978 | Parker ..................... | G21C 9/00 376/280 |
| H91 H | * | 7/1986 | Gabor ..................... | G21C 9/016 376/280 |
| 5,057,271 A | * | 10/1991 | Turricchia ............. | G21C 9/016 376/280 |
| 5,384,814 A | * | 1/1995 | Matzner ............... | G21C 3/3206 376/352 |

(Continued)

FOREIGN PATENT DOCUMENTS

| | | | | |
|---|---|---|---|---|
| CN | 106663479 A | * | 5/2017 | ............. G21C 15/18 |
| JP | 52-118195 | | 10/1977 | |

(Continued)

*Primary Examiner* — Darlene M Ritchie
(74) *Attorney, Agent, or Firm* — LEX IP Meister, PLLC (57) ABSTRACT

There is provided a cooling apparatus for a molten core material, including: two or more cooling material containers disposed under a reactor vessel including a nuclear reactor core and including a cooling material therein; a first screen disposed under the two or more cooling material containers and including two or more first through-holes; and a second screen disposed under the first screen and including two or more second through-holes, wherein an average size of the two or more first through-holes is greater than an average size of the two or more second through-holes.

12 Claims, 11 Drawing Sheets

(56) References Cited

U.S. PATENT DOCUMENTS

| | | | | |
|---|---|---|---|---|
| 6,192,097 | B1* | 2/2001 | Hau | G21C 9/016 |
| | | | | 376/280 |
| 2007/0138072 | A1* | 6/2007 | Bilannin | B01D 24/008 |
| | | | | 210/153 |
| 2012/0300893 | A1* | 11/2012 | Kurita | G21C 15/18 |
| | | | | 376/280 |
| 2017/0323694 | A1* | 11/2017 | Nedorezov | G21C 13/024 |

FOREIGN PATENT DOCUMENTS

| | | | |
|---|---|---|---|
| JP | 8-43576 | 2/1996 | |
| JP | 2000-121771 | 4/2000 | |
| JP | 2000121771 A * | 4/2000 | G21C 9/016 |
| JP | 2009-052951 | 3/2009 | |
| JP | 4786007 | 10/2011 | |
| JP | 2014-124602 | 7/2014 | |
| JP | 2014-190869 | 10/2014 | |
| JP | 2017-187370 | 10/2017 | |
| KR | 10-1998-0086786 | 12/1998 | |
| KR | 10-546317 | 8/2015 | |
| KR | 10-1752215 | 6/2017 | |

\* cited by examiner

COOLING APPARATUS FOR MOLTEN CORE MATERIAL

CROSS-REFERENCE TO RELATED APPLICATION

This application claims priority to and the benefit of Korean Patent Application No. 10-2018-0104724 filed in the Korean Intellectual Property Office on Sep. 3, 2018, the entire contents of which are incorporated herein by reference.

BACKGROUND OF THE INVENTION

(a) Field of the Invention

A cooling apparatus for a molten core material is provided.

(b) Description of the Related Art

A nuclear reactor system is a system which generates steam using heat of a core which is a heating element and generates electricity using steam energy. Since a nuclear reactor is operated in a high-heat environment and components such as a nuclear fuel rod and the like used in the nuclear reactor are strongly radioactive materials, in a case where a reactor problem occurs and a prompt countermeasure is not taken, a surrounding environment may be seriously damaged.

In order to prevent such an event of damage, various security systems for cooling heat generated in a nuclear reactor core when problems such as cooling material loss and the like occur due to accidents occurring in the nuclear reactor may be provided. For example, there is a security system having a form in which the lost cooling material is supplemented or a security system having a form in which the heat generated in the nuclear reactor is absorbed and the generated heat is dissipated to a heat sink, thereby promoting cooling.

However, in a case where a severe accident in which a reactor vessel is melted due to the heat generated in the nuclear reactor core and damaged occurs, a cooling apparatus for cooling a molten nuclear reactor core material is required together with the security systems described above.

Japanese Patent Laid-Open Publication No. 2017-187370 discloses a nuclear reactor containment including a plurality of mass bodies in which fluid such as water or the like is sealed in preparation for a core melt accident. Korean Patent No. 1,546,317 discloses a mechanism for forming a porous molten core material, by which a molten core material sets so as to have a porous structure.

The above information disclosed in this Background section is only for enhancement of understanding of the background of the invention and therefore it may contain information that does not form the prior art that is already known in this country to a person of ordinary skill in the art.

RELATED ART DOCUMENT

Patent Document

Japanese Patent Laid-Open Publication No. 2017-187370
Korean Patent No. 1,546,317

SUMMARY OF THE INVENTION

An exemplary embodiment of the present invention may provide a cooling apparatus for a molten core material having advantages of stably and efficiently cooling a molten core material when a severe accident occurs.

Further, an exemplary embodiment of the present invention may provide a cooling apparatus for a molten core material having advantages of increasing cooling speed and cooling efficiency of a molten core material.

Further, an exemplary embodiment of the present invention may provide a cooling apparatus for a molten core material having advantages of preventing agglomerate of a molten core material and widely dispersing the molten core material.

Further, an exemplary embodiment of the present invention may provide a cooling apparatus for a molten core material having advantages of realizing a cost-saving and a space-saving by being applied to the existing nuclear reactor facility.

An exemplary embodiment of the present invention provides a cooling apparatus for a molten core material, including: two or more cooling material containers disposed under a reactor vessel including a nuclear reactor core and including a cooling material therein; a first screen disposed under the two or more cooling material containers and including two or more first through-holes; and a second screen disposed under the first screen and including two or more second through-holes, wherein an average size of the two or more first through-holes is greater than an average size of the two or more second through-holes.

DETAILED DESCRIPTION OF THE EMBODIMENTS

Embodiments of the present invention will be described in detail with reference to the accompanying drawings so that those skilled in the art to which the present invention pertains may easily practice the present invention. However, the present invention may be implemented in various different forms and is not limited to embodiments described herein. Parts irrelevant to description are omitted in the drawings in order to clearly explain the present invention.

The same or similar elements are denoted by the same reference numerals throughout the specification. In addition, a detailed description of a well-known technique will be omitted.

In the following drawings, thicknesses are exaggerated in order to clearly represent several layers and regions. It will be understood that when an element such as a layer, a film, a region, or a substrate is referred to as being "on" another element, it may be "directly on" another element or may have an intervening element present therebetween. Meanwhile, when an element is referred to as being "directly on" another element, there are no intervening elements present. To the contrary, it will be understood that when an element such as a layer, a film, a region, or a substrate is referred to as being "below" another element, it may be "directly below" another element or may have an intervening element present therebetween. Meanwhile, when an element is referred to as being "directly below" another element, there are no intervening elements present.

Throughout the present specification, unless explicitly described to the contrary, "comprising" any components will be understood to imply the inclusion of other elements rather than the exclusion of any other elements.

A cooling apparatus for a molten core material according to embodiments is an apparatus preventing progression of a severe accident by efficiently dispersing and cooling a molten core material in a case where the severe accident in which a core is melted in a nuclear reactor and the molten core material is leaked to the outside of the nuclear reactor occurs.

Figure 1A:
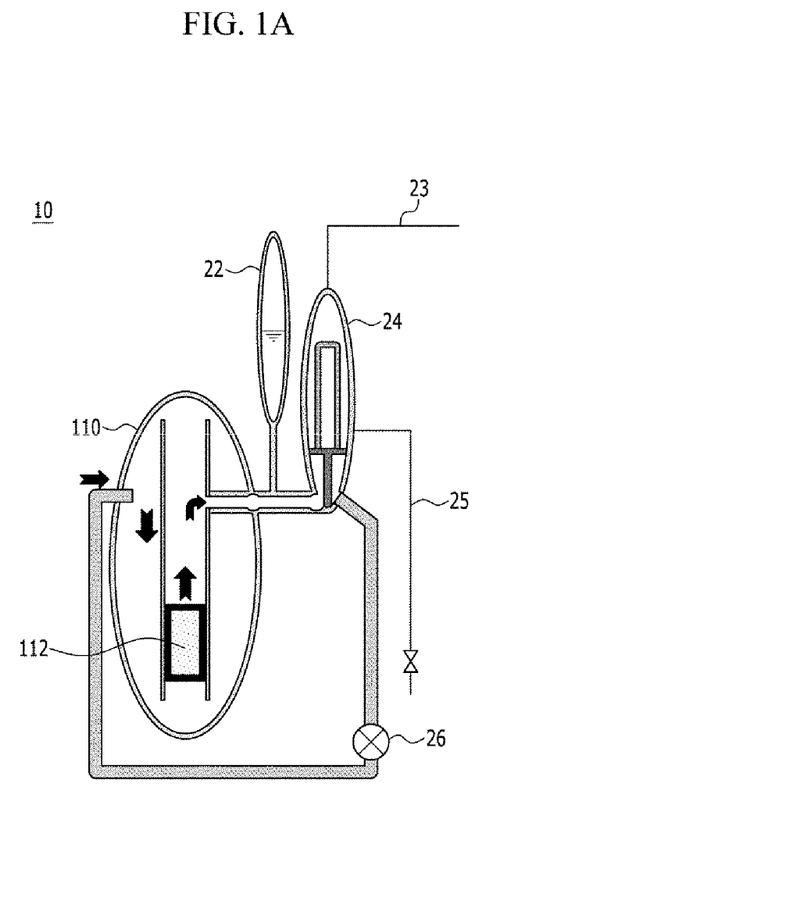
FIG. 1A is a view schematically illustrating a general loop type nuclear reactor system.
Figure 1B:
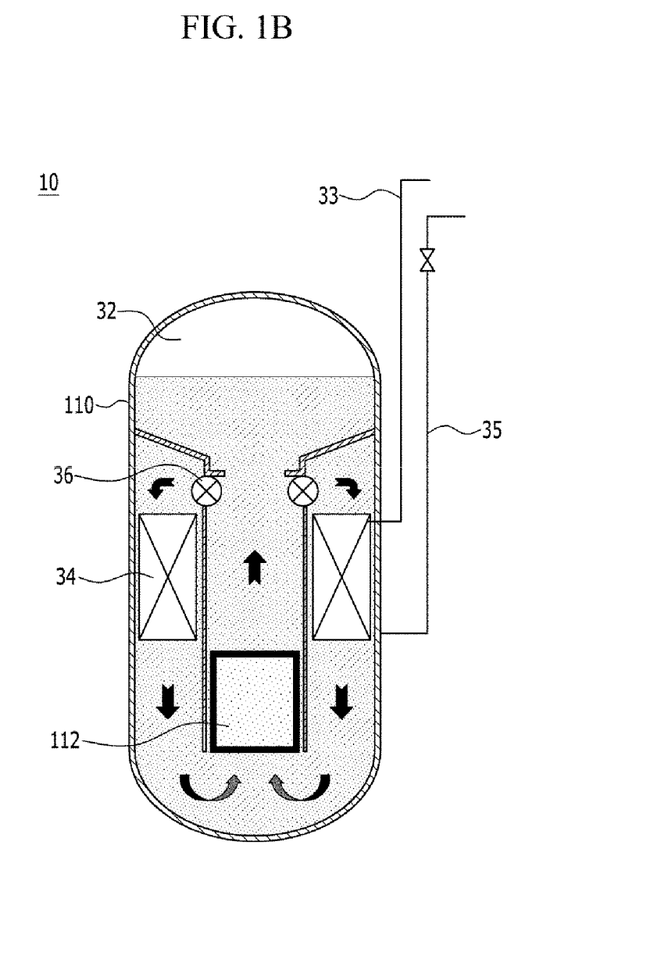
FIG. 1B is a view schematically illustrating a general integrated nuclear reactor system.

FIG. 1A is a view schematically illustrating a general loop type nuclear reactor system and FIG. 1B is a view schematically illustrating a general integrated nuclear reactor system.

Referring to FIGS. 1A and 1B, a nuclear reactor system 10 includes a reactor vessel 110 including a core 112, pressurizers 22 and 32, steam pipes 23 and 33, steam generators 24 and 34, feedwater pipes 25 and 35, cooling material circulation pumps 26 and 36, and the like.

A schematic operation method of the nuclear reactor system 10 will be described. First, an enormous amount of heat energy is generated by nuclear fission of nuclear fuel of the core 112 included in the reactor vessel 110 and the generated heat energy is transferred to the steam generators 24 and 34 through a cooling material (for example, water), which is a heat exchange medium, circulated by the cooling material circulation pumps 26 and 36. Subsequently, a phase of water in the steam generators 24 and 34 is changed, such that high-temperature and high-pressure steam is generated. A turbine (not illustrated) rotates by the generated high-temperature and high-pressure steam supplied to the turbine (not illustrated) through the steam pipes 23 and 33 and a generator (not illustrated) connected to the turbine (not illustrated) rotates together, such that power may be generated. The steam from which the energy is lost by the rotation of the turbine (not illustrated) goes through the phase change to be converted into water. The water is supplied to the steam generators 24 and 34 again through the feedwater pipes 25 and 35. The pressurizers 22 and 32 may relieve pressure of the system.

In such a nuclear reactor system 10, when the reactor vessel 110 is damaged or cooling fails, for example, the circulation of the cooling material is not performed and the like, a severe accident in which the reactor vessel 110 is melted due to the heat generated in the core 112 and damaged may occur.

Figure 2A:
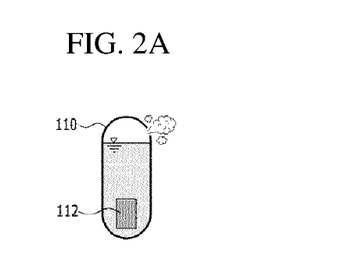
FIGS. 2A to 2C are views illustrating progression of a nuclear reactor core melt accident.
Figure 2B:
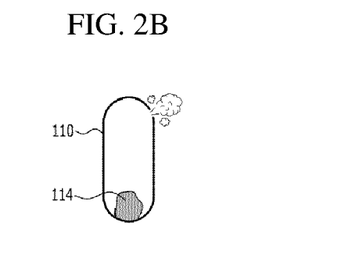
Figure 2C:
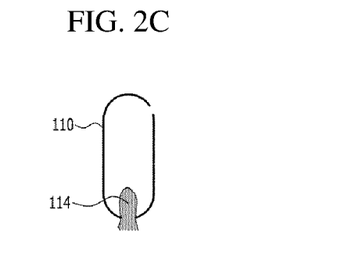

FIGS. 2A to 2C are views illustrating progression of a nuclear reactor core melt accident.

Referring to FIGS. 2A to 2C, when the reactor vessel 110 accommodating the core 112 is damaged, the cooling material included in the reactor vessel 110 is evaporated and may be leaked to a damaged part. Accordingly, in a case where excessive heat generated in the core 112 is not cooled, such that a temperature of the core 112 exceeds the melting point itself, as the melting of the core 112 proceeds, a molten core material 114 may be generated. Since a temperature of the molten core material 114 is very high, the reactor vessel 110 may be melted and the molten core material 114 may penetrate a lower portion of the reactor vessel 110 and flow out from the reactor vessel 110.

Such an accident corresponds to a very severe accident. A general nuclear reactor system 10 is provided with a safety system by which the reaction of the core 112 is stopped and the cooling material is rapidly supplemented so as to lower the temperature of the core 112 before the molten core material 114 is leaked to the outside of the reactor vessel 110, but it may be difficult to prevent leakage of the molten core material 114 in some cases. In the case where the molten core material 114 is leaked, it is important to cool the molten core material 114 as quickly as possible.

The cooling apparatus for a molten core material according to embodiments is an apparatus for cooling the molten core material 114 as quickly as possible.

Figure 3:
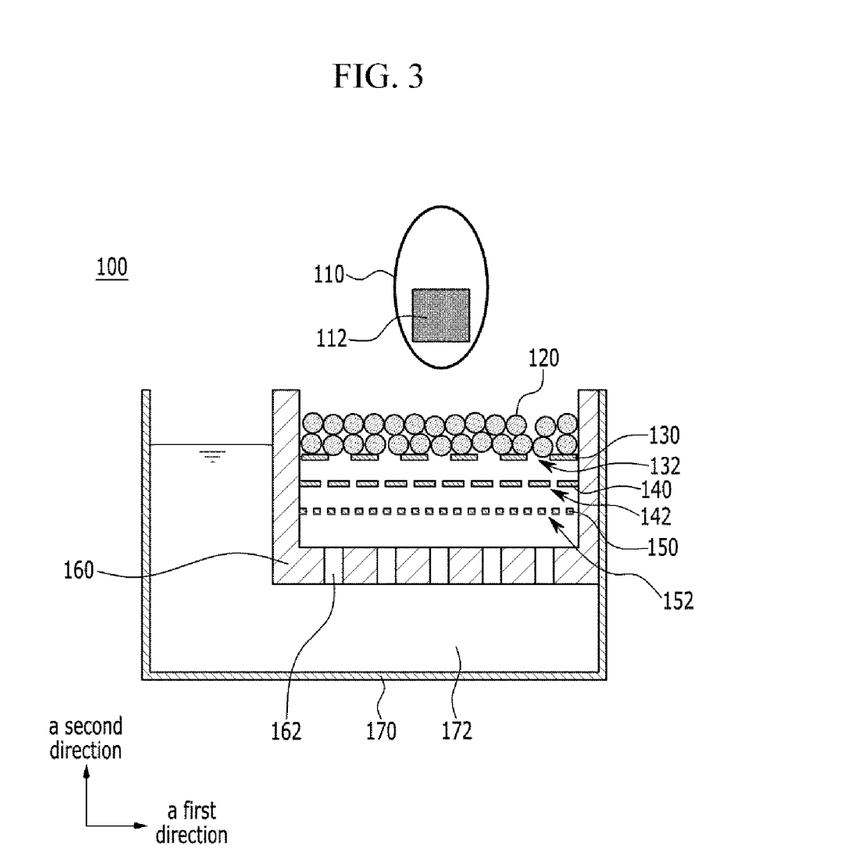
FIG. 3 is a view illustrating a cross section of a cooling apparatus for a molten core material according to an embodiment.
Figure 4A:
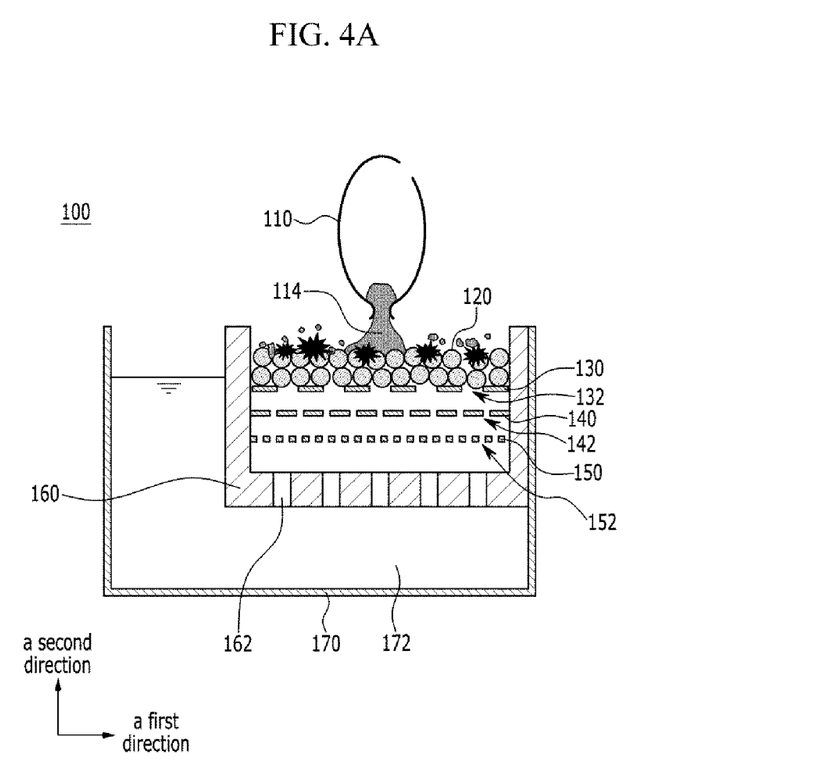
FIGS. 4A and 4B are views illustrating an operation method of the cooling apparatus for a molten core material of FIG. 3.
Figure 4B:
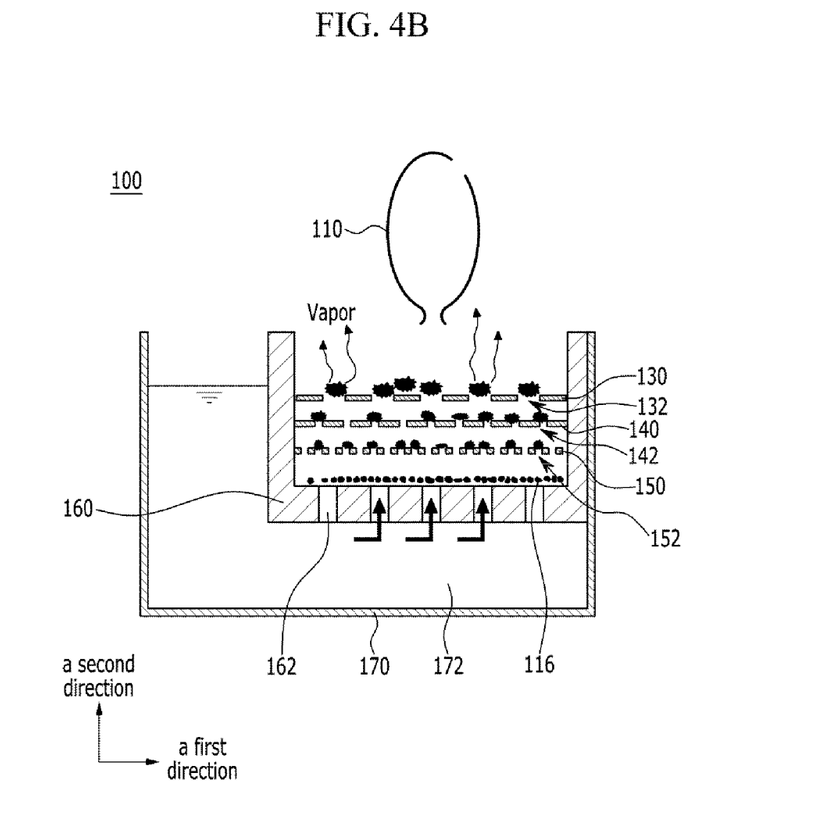
Figure 5:
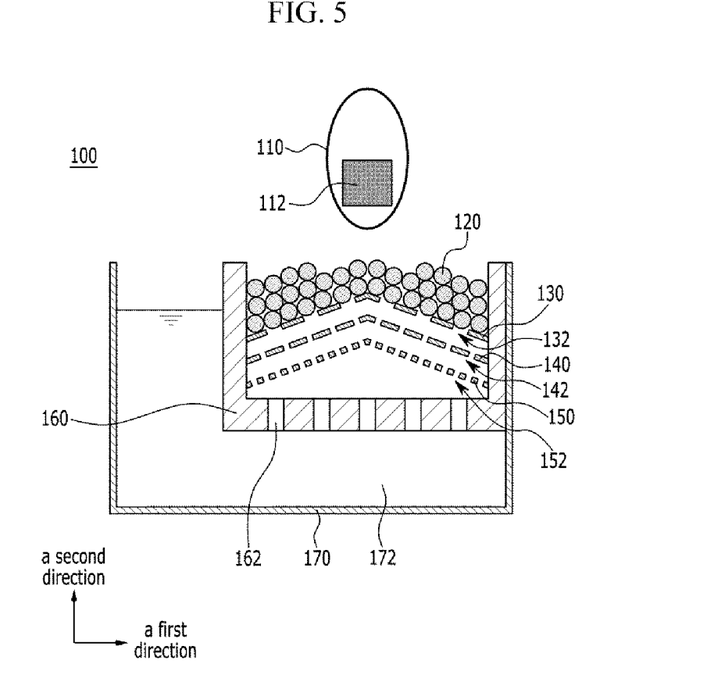
FIG. 5 is a view illustrating a cross section of a cooling apparatus for a molten core material according to an embodiment.
Figure 6A:
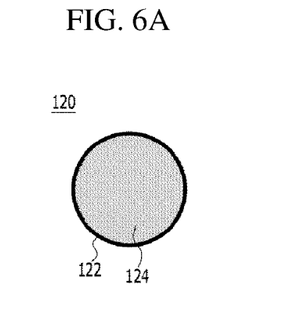
FIGS. 6A and 6B are views illustrating examples of a cooling material container according to an embodiment.
Figure 6B:
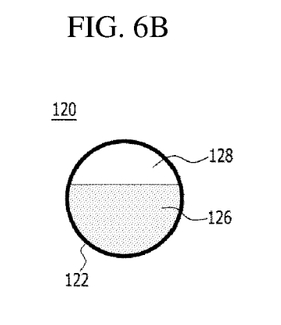
Figure 7A:
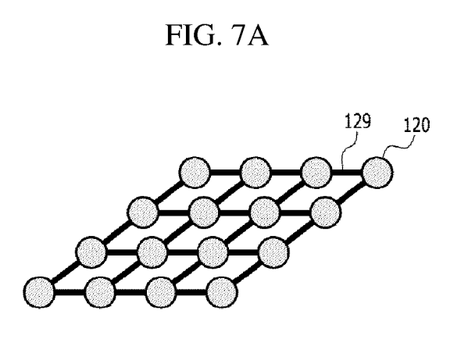
FIGS. 7A and 7B are views illustrating an example of a cooling material container and a container connection structure according to an embodiment.
Figure 7B:
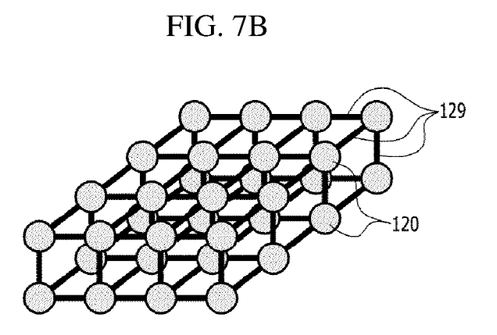
Figure 8A:
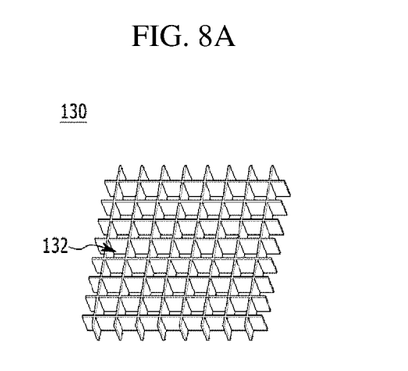
FIGS. 8A and 8B are views illustrating an example of a first screen according to an embodiment.
Figure 8B:
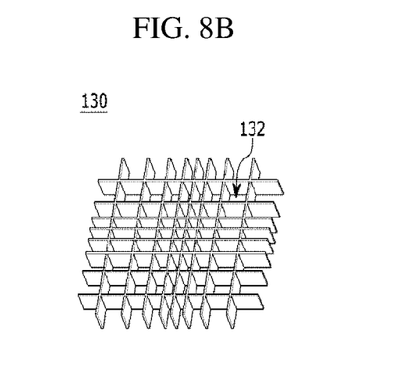
Figure 9:
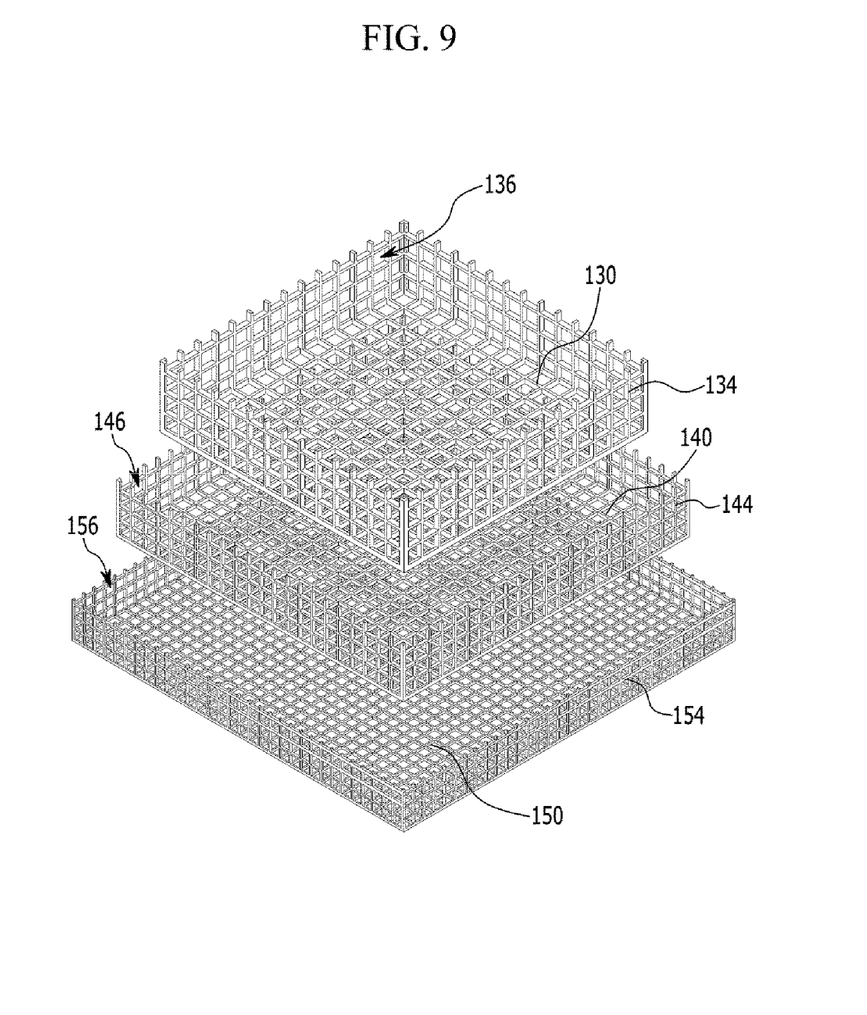
FIG. 9 is a view illustrating an example of a first screen, a second screen, and a third screen according to an embodiment.

FIG. 3 is a view illustrating a cross section of a cooling apparatus for a molten core material according to an embodiment and FIGS. 4A and 4B are views illustrating an operation method of the cooling apparatus for a molten core material of FIG. 3. In addition, FIG. 5 is a view illustrating a cross section of a cooling apparatus for a molten core material according to an embodiment. FIGS. 6A and 6B are views illustrating examples of a cooling material container according to an embodiment, FIGS. 7A and 7B are views illustrating an example of a cooling material container and a container connection structure according to an embodiment, FIGS. 8A and 8B are views illustrating an example of a first screen according to an embodiment, and FIG. 9 is a view illustrating an example of a first screen, a second screen, and a third screen of the cooling apparatus for a molten core material according to an embodiment.

A cooling apparatus 100 for a molten core material includes two or more cooling material containers 120 disposed under the reactor vessel 110 including the core 112 and including a cooling material therein; a first screen 130 disposed under the two or more cooling material containers 120 and including two or more first through-holes 132; and a second screen 140 disposed under the first screen 130 and including two or more second through-holes 142. In addition, the cooling apparatus 100 for a molten core material includes a third screen 150 disposed under the second screen 140 and including two or more third through-holes 152.

The case in which the cooling apparatus 100 for a molten core material includes three screens 130, 140, and 150 is illustrated in FIGS. 3 to 5 for convenience of explanation, but the cooling apparatus 100 for a molten core material according to the embodiments may include two screens or four or more screens.

The cooling apparatus 100 for a molten core material is basically included in a molten core material support structure 160. The molten core material support structure 160 is disposed in a coolant tank 170 including a coolant 172 and the coolant 172 may be introduced into the molten core material support structure 160, if necessary.

The cooling material container 120 includes an outer wall 122 and a cooling material therein. The cooling material may include a cooling fluid 124 such as water or the like (refer to FIG. 6A) and may include boron 126 and non-condensable gas 128 (refer to FIG. 6B). In addition, although not illustrated, the cooling material may include the cooling fluid 124 and the non-condensable gas 128.

When the molten core material 114 is leaked to the outside of the reactor vessel 110 and is in contact with the cooling material containers 120, as the cooling material expands and explodes, the molten core material 114 is crushed and fragmented, such that molten core material fragments 116 are formed.

In a case where the cooling material includes the boron 126 and the non-condensable gas 128, chain reaction of the molten core material 114 including a nuclear material is prevented by the boron 126. An explosive force is increased by the non-condensable gas 128, such that the molten core material 114 may be efficiently crushed and the molten core material fragments 116 may be dispersed in a wide range. Here, the non-condensable gas 128 may include nitrogen (N$_2$) gas or inert gas, but is not limited thereto.

Even in a case where the cooling material includes the cooling fluid 124 and the non-condensable gas 128, an explosive force is increased by the non-condensable gas 128, such that the molten core material 114 may be efficiently crushed.

The outer wall 122 of the cooling material container 120 may include a metal material, a non-metal material, or the like and may have various thicknesses and strengths within a range in which the cooling material container may be exploded when the cooling material inside the cooling material container 120 expands by heat transfer.

A cross section of the cooling material container 120 may be an oval shape or a polygonal shape and may have various sizes. The cooling material containers 120 may be randomly arranged and may be disposed in a pre-designed form. As an example, the cooling material container 120 may be a spherical shape or a cubic shape and may be disposed in a multi-layered structure having at least two layers, but is not limited thereto.

The cooling material containers 120 which are adjacent to each other may be connected to each other by container connection structures 129. The cooling material containers 120 which are disposed in the same layer and adjacent to each other may be connected to each other by the container connection structures 129 (refer to FIG. 7A). The cooling material containers 120 which are disposed in different layers and adjacent to each other may be connected to each other by the container connection structures 129 (refer to FIG. 7B).

A specific gravity of the molten core material 114 is much greater than that of the cooling material container 120. Accordingly, when the molten core material 114 is leaked to the outside of the reactor vessel 110 and is in contact with the cooling material containers 120, the cooling material containers 120 may be suddenly floated (moved upwards). As a result, the leaked molten core material 114 may not be effectively crushed.

The phenomenon in which the cooling material containers 120 are suddenly floated may be minimized by the container connection structures 129. Accordingly, the leaked molten core material 114 may be effectively fragmented.

The container connection structure 129 may include, for example, the same material as the outer wall 122 of the cooling material container 120, but is not limited thereto, and may include various materials. In addition, the container connection structure 129 may have various lengths, diameters, or thicknesses, if necessary.

The molten core material fragments 116 may be widely and evenly dispersed on the first screen 130, the second screen 140, the third screen 150, and a lower surface of the molten core material support structure 160 and may be cooled by the coolant 172 introduced from the coolant tank 170.

The molten core material 114 may be agglomerated due to its weight and viscosity. However, in a case where the cooling apparatus 100 for a molten core material according to the embodiment is applied to the nuclear reactor system, the molten core material 114 is crushed by the cooling material containers 120 and two or more screens 130, 140, and 150, and the molten core material fragments 116 are widely dispersed, such that the agglomerate phenomenon may be minimized. In addition, as the molten core material 114 is crushed, a surface area thereof is enlarged. Therefore, cooling speed and cooling efficiency of the molten core material 114 may be increased.

In order to more widely disperse the molten core material fragments 116 fragmented by the cooling material containers 120, two or more screens 130, 140, and 150 may be disposed under the cooling material containers 120. The screens 130, 140, and 150 include two or more through-holes 132, 142, and 152, respectively. The through-holes 132, 142, and 152 may be designed so that an average size of each of the through-holes 132, 142, and 152 becomes smaller in a direction from the top to the bottom.

As an example, the first screen 130, the second screen 140, and the third screen 150 may be sequentially disposed under the cooling material containers 120 in a direction from the top to the bottom. An average size of two or more first through-holes 132 may be greater than an average size of two or more second through-holes 142 and the average size of two or more second through-holes 142 may be greater than an average size of two or more third through-holes 152.

In a case where the size of the molten core material fragment 116 becomes smaller than that of the first through-hole 132 of the first screen 130, the molten core material fragment 116 may pass through the second screen 140. In addition, in a case where the size of the molten core material fragment 116 becomes greater than that of the second through-hole 142 of the second screen 140, the molten core material fragment 116 may be disposed on the second screen 140. In addition, in a case where the size of the molten core material fragment 116 becomes smaller than that of the second through-hole 142 of the second screen 140, the molten core material fragment 116 may pass through the second through-hole 142. Similarly, the molten core material fragments 116 after passing through the second through-hole 142 may pass through the third through-hole 152 of the third screen 150 or may not pass therethrough (refer to FIG. 4A). Accordingly, an average size of the molten core material fragments 116 disposed on the first screen 130 may be greater than an average size of the molten core material fragments 116 disposed on the second screen 140. The average size of the molten core material fragments 116 disposed on the second screen 140 may be greater than an average size of the molten core material fragments 116 disposed on the third screen 150.

In summary, the molten core material fragments 116 crushed by the explosion of the cooling material containers 120 may be disposed on the first screen 130, may be disposed on the second screen 140, may be disposed on the third screen 150, and may be disposed on an inner surface of the molten core material support structure 160. Accordingly, the molten core material 114 is fragmented into the molten core material fragments 116. The molten core material fragments 116 may be widely dispersed by the first screen 130, the second screen 140, and the third screen 150. Therefore, since a contact area between the molten core material fragments 116 and the coolant 172 becomes large as the coolant 172 is supplied to the molten core material support structure 160 through a coolant introduction passage 162, cooling speed and cooling efficiency of the molten core material 114 may be further increased.

The maximum size of the first through-hole 132 may be smaller than the minimum size of the cooling material container 120. Therefore, the cooling material container 120 may be disposed stably on the first screen. For example, the maximum size of the first through-hole 132 may be about less than 10 cm.

Two or more first through-holes 132 may have the same size, two or more second through-holes 142 may have the same size, and two or more third through-holes 152 may have the same size (refer to FIG. 8A).

The first through-hole 132, the second through-hole 142, and the third through-hole 152 may have various sizes.

As an example, any two first through-holes 132 among two or more first through-holes 132 may have different sizes, any two second through-holes 142 among two or more second through-holes 142 may have different sizes, and any two third through-holes 152 among two or more third through-holes 152 may have different sizes.

As another example, a size of the first through-hole 132 may be increased from the center of the first screen 130 to an outer portion of the first screen 130 (refer to FIG. 8B), a size of the second through-hole 142 may be increased from the center of the second screen 140 to an outer portion of the second screen 140, and a size of the third through-hole 152 may be increased from the center of the third screen 150 to an outer portion of the third screen 150. In FIG. 8, only the first screen 130 is illustrated for convenience of description, but the second through-hole 142 and the third through-hole 152 may have various sizes.

As an example, since a more massive large particle tends to move a longer distance due to inertial mass, the sizes of the through-holes 132, 142, and 152 of the screens 130, 140, and 150 may be increased gradually from the center of the screens 130, 140, and 150 to the outer portion of the screens 130, 140, and 150, respectively when the molten core material 114 is crushed by the expansion and explosion of the cooling material container 120. Therefore, the molten core material fragments 116 may be widely and evenly dispersed.

The first through-hole 132, the second through-hole 142, and the third through-hole 152 may have various shaped cross sections. For example, a cross section of the first through-hole 132, a cross section of the second through-hole 142, and a cross section of the third through-hole 152 may be designed to have a polygonal shape or an oval shape, respectively.

Each of the first screen 130, the second screen 140, and the third screen 150 of the cooling apparatus 100 for a molten core material according to the embodiment may be parallel to a horizontal plane or at least some of the first screen 130, the second screen 140, and the third screen 150 may have an inclined shape with respect to the horizontal plane. FIGS. 3 to 4B illustrate the case in which the cooling apparatus 100 for a molten core material has the screens 130, 140, and 150 parallel to the horizontal plane. FIG. 5 illustrates the case in which the screens 130, 140, and 150 of the cooling apparatus 100 for a molten core material each have an inclined shape (mountain shape). However, the cooling apparatus 100 for a molten core material is not limited to the illustrated shape and may have any shape as long as it is likely to appropriately disperse the molten core material 114. Here, the horizontal plane means a plane parallel to a first direction of FIGS. 3 and 5.

The case in which all the first screen 130, the second screen 140, and the third screen 150 have the same inclination is illustrated in FIG. 5. However, a case in which the first screen 130 is parallel to the horizontal plane and the second screen 140 and the third screen 150 are inclined with respect to the horizontal plane may be possible and a case in which only some of the screens 130, 140, and 150 are inclined with respect to the horizontal plane may be possible.

A total size or area of the first screen 130, a total size or area of the second screen 140, and a total size or area of the third screen 150 may be different from each other.

As an example, an area of a cross section (a cross section perpendicular to a second direction of FIGS. 3 and 5) of the second screen 140 facing the reactor vessel 110 may be greater than an area of a cross section (a cross section perpendicular to the second direction of FIGS. 3 and 5) of the first screen 130 facing the reactor vessel 110. An area of a cross section (a cross section perpendicular to the second direction of FIGS. 3 and 5) of the third screen 150 facing the reactor vessel 110 may be greater than the area of the cross section (a cross section perpendicular to the second direction of FIGS. 3 and 5) of the second screen 140 facing the reactor vessel 110.

In this case, since the screens 130, 140, and 150 are sequentially disposed in an ascending order of a size or an area, such that as the molten core material fragments 116 move down, the molten core material fragments 116 may be dispersed more stably.

Referring to FIG. 9, the first screen 130 may further include a first side surface screen 134 disposed at at least one side thereof and a first side surface through-hole 136. In addition, the second screen 140 may further include a second side surface screen 144 disposed at at least one side thereof and a second side surface through-hole 146. In addition, the third screen 150 may further include a third side surface screen 154 disposed at at least one side thereof and a third side surface through-hole 156.

As an example, the first side surface screens 134 may be disposed at all edge portions of the first screen 130, the second side surface screens 144 may be disposed at all edge portions of the second screen 140, and the third side surface screens 154 may be disposed at all edge portions of the third screen 154. In this case, the first screen 130, the second screen 140, and the third screen 150 may have a general basket shape.

In a case where the side surface screens 134, 144, and 154 exist, the molten core material fragments 116 may be disposed on the side surface screens 134, 144, and 154, therefore the molten core material fragments 116 may be more widely dispersed and the contact area between the molten core material fragments 116 and the coolant 172 may be more enlarged. As a result, cooling speed and cooling efficiency of the molten core material 114 may be more increased.

Even in a case where the side surface screens 134, 144, and 154 exist, as illustrated in FIG. 9, a total size of the second screen 140 may be greater than that of the first screen 130 and a total size of the third screen 150 may be greater than that of the second screen 140.

The first screen 130, the second screen 140, and the third screen 150 may include a metal or an alloy material having a melting temperature higher than about 2,000° C. which is a melting temperature of the core 112. As an example, first screen 130, the second screen 140, and the third screen 150 may include a tungsten-based material.

The cooling apparatus 100 for a molten core material according to the embodiment including the cooling material container 120 and two or more screens 130, 140, and 150 may be applied to the existing nuclear reactor facility as it is. Accordingly, it is possible to realize a cost-saving and a space-saving with no requirement of an additional space security and to prepare for a severe accident in which the molten core material is leaked by simply applying the cooling apparatus for a molten core material to the existing nuclear reactor facility.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

<Description of symbols>

| | |
|---|---|
| 10: nuclear reactor system | 22, 32: pressurizer |
| 23, 33: steam pipe | 24, 34: steam generator |
| 25, 35: feedwater pipe | |
| 26, 36: cooling material circulation pump | |
| 110: reactor vessel | 112: core |
| 114: molten core material | 120: cooling material container |
| 122: outer wall | 124: cooling fluid |
| 126: boron | 128: non-condensable gas |
| 130: first screen | 132: first through-hole |
| 140: second screen | 142: second through-hole |
| 150: third screen | 152: third through-hole |
| 160: molten core material support structure | |
| 162: coolant introduction passage | |
| 170: coolant tank | 172: coolant |

What is claimed is:

1. A cooling apparatus for a molten core material, comprising:
   two or more cooling material containers disposed under a reactor vessel including a nuclear reactor core, and including a cooling material therein;
   a first screen disposed under the two or more cooling material containers and including two or more first through-holes;
   a second screen disposed under the first screen and including two or more second through-holes; and
   a third screen disposed under the second screen and including two or more third through-holes,
   wherein an average size of the two or more first through-holes is greater than an average size of the two or more second through-holes,
   wherein the average size of the two or more second through-holes is greater than an average size of the two or more third through-holes, and
   wherein any two first through-holes among the two or more first through-holes have different sizes, any two second through-holes among the two or more second through-holes have different sizes, or any two third through-holes among the two or more third through-holes have different sizes.

2. The cooling apparatus of claim 1, wherein:
   a size of the first through-hole is increased from a center of the first screen to an outer portion of the first screen, a size of the second through-hole is increased from a center of the second screen to an outer portion of the second screen, or a size of the third through-hole is increased from a center of the third screen to an outer portion of the third screen.

3. The cooling apparatus of claim 1, wherein:
   each of a cross section of the first through-hole, a cross section of the second through-hole, a cross section of the third through-hole has a polygonal shape or an oval shape.

4. The cooling apparatus of claim 1, wherein:
   an area of a cross section of the second screen facing the reactor vessel is greater than an area of a cross section of the first screen facing the reactor vessel, and an area of a cross section of the third screen facing the reactor vessel is greater than the area of the cross section of the second screen facing the reactor vessel.

5. The cooling apparatus of claim 1, wherein:
   each of the first screen, the second screen, and the third screen is parallel to a horizontal plane or at least some of the first screen, the second screen, and the third screen are inclined with respect to the horizontal plane.

6. The cooling apparatus of claim 1, wherein:
   the first screen further includes a first side surface screen disposed at at least one side thereof and a first side surface through-hole disposed in the first side surface screen,
   the second screen further includes a second side surface screen disposed at at least one side thereof and a second side surface through-hole disposed in the second side surface screen, and
   the third screen further includes a third side surface screen disposed at at least one side thereof and a third side surface through-hole disposed in the third side surface screen.

7. The cooling apparatus of claim 1, further comprising a container connection structure connecting the two or more cooling material containers adjacent to each other.

8. The cooling apparatus of claim 1, further comprising a molten core material support structure disposed under the third screen and including two or more coolant introduction passages into which a coolant is introduced from a coolant tank.

9. The cooling apparatus of claim 1, wherein:
   a maximum size of the first through-hole is smaller than a minimum size of the cooling material container.

10. The cooling apparatus of claim 9, wherein:
    the maximum size of the first through-hole is less than 10 cm.

11. A cooling apparatus for a molten core material, comprising:
    two or more cooling material containers disposed under a reactor vessel including a nuclear reactor core, and including a cooling material therein;
    a first screen disposed under the two or more cooling material containers and including two or more first through-holes; and
    a second screen disposed under the first screen and including two or more second through-holes,
    wherein an average size of the two or more first through-holes is greater than an average size of the two or more second through-holes, and
    wherein any two first through-holes among the two or more first through-holes have different sizes, or any two second holes among the two or more second through-holes have different sizes have different sizes.

12. A cooling apparatus for a molten core material, comprising:
two or more cooling material containers disposed under a reactor vessel including a nuclear reactor core, and including a cooling material therein;
a first screen disposed under the two or more cooling material containers and including two or more first through-holes; and
a second screen disposed under the first screen and including two or more second through-holes,
wherein an average size of the two or more first through-holes is greater than an average size of the two or more second through-holes,
wherein the first screen includes a first side surface screen disposed in a side of the first screen and a first side surface through-hole disposed in the first side surface screen, and
wherein the second screen includes a second side surface screen disposed in a side of the second screen and a second side surface through-hole disposed in the second side surface screen.

\* \* \* \* \*